Jan. 25, 1944.  A. C. RUGE  2,340,146

STRAIN GAUGE

Filed Oct. 2, 1941

INVENTOR
ARTHUR C. RUGE
BY
ATTORNEY

Patented Jan. 25, 1944

2,340,146

UNITED STATES PATENT OFFICE 2,340,146

STRAIN GAUGE

Arthur C. Ruge, Cambridge, Mass.

Application October 2, 1941, Serial No. 413,333

4 Claims. (Cl. 201—63)

This invention relates generally to strain gauges and more particularly to a bonded type electrical strain sensitive gauge in which the resistance of a strain responsive filament varies in proportion to the strain.

The gauge herein disclosed is of the general type described in my copending application Serial No. 295,207, filed September 16, 1939, wherein a continuously solid metallic wire filament, of circular or other cross-sectional form, is bonded throughout its effective length to the surface of a member subjected to strain.

One object of my invention is to provide an improved method and apparatus for manufacturing in quantities bonded type electrical strain sensitive gauges and at the same time providing gauges having a high degree of accuracy, sensitivity and uniformity. Another object is to provide an improved bonded type electrical strain sensitive gauge having considerable flexibility so that it may be easily, efficiently and effectively applied to an irregular surface.

A further object is to provide an improved gauge and improved means for commonly supporting a multiplicity of the same in a simple and rugged manner, while at the same time allowing the gauges to be individually quickly removed for use on a test member while the balance of the gauges remain in their normal unused supported position.

In the specific aspect of my invention I accomplish certain of the foregoing objects by employing a flexible membrane in such a manner that it performs the dual functions of commonly supporting a multiplicity of the gauges before the same are placed in use and of serving as an insulating electrical membrane for the gauge filaments when the gauges are individually removed and bonded to a test member. To obtain individual gauges from the common membrane and at the same time employing the membrane for insulating purposes for individual gauges, I use the extremely simple and highly effective expedient of merely cutting the common membrane around the outside of any particular gauge to be removed, it being understood that each gauge filament is bonded to the membrane so as to remain a unitary part of the cutout portion of the membrane.

Other objects and advantages will be more apparent to those skilled in the art from the following description of the accompanying drawing in which.

Figure 1:
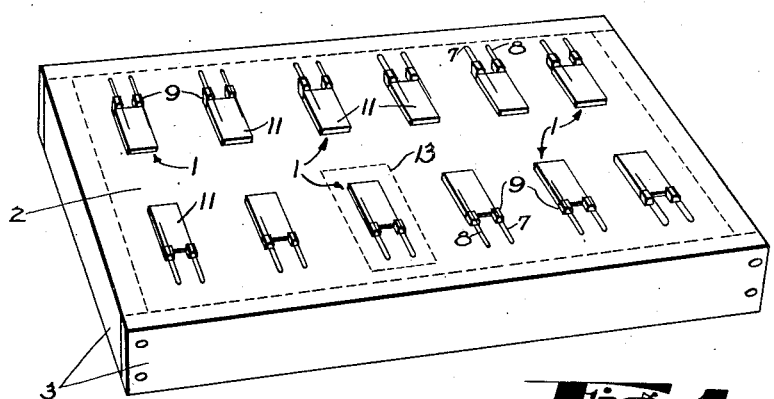
Fig. 1 is a perspective of a group of gauges supported in my improved manner before being applied.

In the drawing I have shown a strain gauge assembly having a plurality of my improved gauges generally indicated at 1 mounted upon a common flexible electrical insulating membrane 2, preferably paper, which is cemented along its edges to the top surface of a wooden rectangular frame 3. This paper is thus exposed on opposite sides at its intermediate area and may be slightly moistened before being cemented to the carrying frame thereby causing the paper to become taut when dry. After the paper is cemented to the box a plurality of my improved gauges are assembled directly thereon. The description of one gauge will suffice for all. This is accomplished first by electrically connecting a strain sensitive wire filament 4 to the bent ends 5 and 6 of a pair of leads 7 and 8. These leads are placed in position as shown and a pair of reinforcing blocks 9 having a small groove cut in their under side to receive the leads are placed over the top of the lower legs 10 of the leads and cemented to the paper membrane. The wire filament is suitably shaped as may be desired, specifically shown as being reversely bent, and the entire length of the filament together with the lower portion of the leads 5, 6 and 10 are cemented to the membrane. The cement may be Duco household cement, Glyptal or any other equivalent bonding cement. The blocks 9 may be wood or other insulating material.

To protect the filament from drafts or local fluctuations in atmospheric temperature a small felt pad 11 or other suitable heat insulating material of a flexible nature is placed over the whole length of the filament and preferably to a point adjacent the two wooden blocks. Each lead 7 and 8 has an upper portion overlying the felt pad and of sufficient length to permit easy connection to any usual instruments or circuits such as a Wheatstone bridge in which the gauge may be used all as disclosed in my said copending application.

Figure 2:
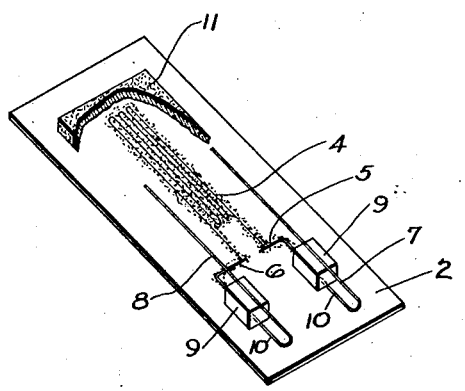
Fig. 2 is a perspective of a gauge removed from Fig. 1, part of the temperature control pad being cut away to show other details of construction.
Figure 3:
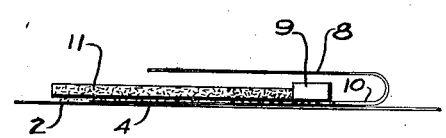
Fig. 3 is a side elevation of my improved gauge.

When the gauges are manufactured and assembled on the common membrane 2 in the manner above described, it is seen that the plurality of gauges specifically shown as twelve in number are conveniently carried or packaged for storage, transporation or handling with minimum possibility of damage to the gauges. When it is desired to use a gauge the membrane is cut around any one of the gauges as indicated by the dotted line 13. This cut-out gauge is shown in Fig. 2 and the under surface of the membrane 2 is then entirely cemented to the surface of a member under test. In this way the entire effective length of the filament is cemented to the test member and at the same time the membrane 2 serves as an electrical insulation between the test member and the gauge filament which is on top of the membrane.

From the foregoing disclosure, it is seen that I have provided an extremely simple, effective and economical means for manufacturing and using the gauges, as well as providing a very convenient form for shipping and handling. In addition, the gauges are reasonably flexible so as to be adaptable to surfaces curved longitudinally or transversely.

It will of course be understood that various changes in details of construction and arrangement of parts may be made by those skilled in the art without departing from the spirit of the invention as set forth in the appended claims.

I claim:

1. A strain gauge assembly comprising, in combination, a frame, a membrane secured to and enclosed by said frame, and a plurality of continuous solid filaments of electrical conducting material whose electrical resistance varies with its strain, said filaments being individually cemented throughout their effective length to said membrane whereby any one of said filaments may be removed with a cut-out portion of said membrane which forms an insulation for the filament while the remaining portion of the membrane continues to be secured to said frame to act as a support and carrier for the balance of the filaments.

2. A strain gauge assembly comprising, in combination, a frame, a taut membrane secured along its edges to said frame so that the intermediate area of the membrane is exposed on the top and bottom, a continuous solid filament of electrical conducting material whose electrical resistance varies with its strain, said filament being cemented throughout its effective length to one side of said membrane, and leads for the filament supported by the membrane whereby the filament and its leads may be removed as a unit together with a cut-out portion of said membrane while the remainder of the membrane is attached to the frame.

3. A strain gauge comprising, in combination, a membrane that is freely flexible when not in use, a continuous solid filament of electrical conducting material whose electrical resistance varies with its strain, said filament being cemented throughout its effective length to one side of said membrane so as to be flexible therewith and thereby form a self-contained unitary structure, the other side of said membrane being normally cemented throughout the effective length of said filament to the surface of a member subject to strain, and a pad supported on said membrane so as to overlie said filament to shield it against direct atmospheric temperature changes.

4. The method of manufacturing strain gauges consisting in securing a moistened membrane to a frame which substantially totally encircles a given area of the membrane, then allowing said membrane to dry so that it becomes taut and finally placing a continuous solid filament of electrical conducting material upon said taut membrane and bonding its entire effective length thereto by cement placed directly on the taut membrane whereby said filament remains as an integral part of said frame supported taut membrane when not in use but is adapted to be removed for use by cutting the membrane between the frame and filament around the outside of the latter.

ARTHUR C. RUGE.